US008649050B2

(12) United States Patent
Tao et al.

(10) Patent No.: US 8,649,050 B2
(45) Date of Patent: Feb. 11, 2014

(54) IMAGE FORMING APPARATUS

(75) Inventors: Kozo Tao, Osaka (JP); Masaki Kikuchi, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 112 days.

(21) Appl. No.: 13/350,435

(22) Filed: Jan. 13, 2012

(65) Prior Publication Data

US 2012/0182583 A1 Jul. 19, 2012

(30) Foreign Application Priority Data

Jan. 13, 2011 (JP) ................................. 2011-005112

(51) Int. Cl.
*G06K 15/00* (2006.01)
(52) U.S. Cl.
USPC .......... 358/1.16; 358/1.9; 358/1.14; 358/1.15
(58) Field of Classification Search
USPC ......................................... 358/1.9, 1.14–1.16
See application file for complete search history.

(56) References Cited

U.S. PATENT DOCUMENTS

| 6,266,497 | B1 * | 7/2001 | Maekawa | 399/85 |
|---|---|---|---|---|
| 6,850,335 | B1 * | 2/2005 | Barry et al. | 358/1.15 |
| 2005/0246684 | A1 * | 11/2005 | Shiraishi | 717/115 |
| 2006/0044616 | A1 * | 3/2006 | Satoh et al. | 358/3.01 |
| 2009/0296157 | A1 * | 12/2009 | Misawa et al. | 358/3.24 |
| 2010/0141998 | A1 * | 6/2010 | Yanagisawa | 358/1.16 |
| 2010/0245914 | A1 * | 9/2010 | Harada et al. | 358/1.16 |
| 2011/0286015 | A1 * | 11/2011 | Maltz et al. | 358/1.9 |
| 2011/0317202 | A1 * | 12/2011 | Negishi | 358/1.14 |
| 2012/0050820 | A1 * | 3/2012 | Ashida | 358/447 |

FOREIGN PATENT DOCUMENTS

| JP | 10294834 A | * | 11/1998 | H04N 1/21 |
|---|---|---|---|---|
| JP | 2000029646 A | * | 1/2000 | G06F 3/12 |
| JP | 2000168148 A | * | 6/2000 | B41J 2/44 |
| JP | 2003162717 A | * | 6/2003 | G06T 5/00 |
| JP | 2004-237674 A | | 8/2004 | |
| JP | 2004237674 A | * | 8/2004 | B41J 5/30 |
| JP | 2006094400 A | * | 4/2006 | H04N 1/00 |
| JP | 2008067049 A | * | 3/2008 | H04N 1/40 |
| JP | 2008078923 A | * | 4/2008 | H04N 1/00 |
| JP | 2010-74445 A | | 4/2010 | |
| JP | 2010187169 A | * | 8/2010 | H04N 1/41 |
| JP | 2010226518 A | * | 10/2010 | H04N 1/00 |
| JP | 2010258903 A | * | 11/2010 | H04N 1/387 |

OTHER PUBLICATIONS

Translation of JP2004-237674.
Communication from a foreign patent office for counterpart foreign application dated Apr. 23, 2013.

* cited by examiner

*Primary Examiner* — Houshang Safaipour
*Assistant Examiner* — Edwin S Leland, III

(57) ABSTRACT

An image forming apparatus includes: a memory buffer that has a plurality of band buffers for storing band data in which image data is divided into a plurality of bands; a data processing unit that performs a specific process with respect to the band data stored in the memory buffer; a storage unit having a storage area that store image data of a plurality of pages of an original of a specific size, storing processed band data that has been subjected to the specific process by the data processing unit into the storage area and, outputting a plurality of pieces of the processed band data stored in the storage area; and an output processing unit that performs a print process based on the plurality of pieces of the processed band data that is output from the storage unit.

12 Claims, 11 Drawing Sheets

FIG. 10

| COLOR | WIDTH | HEIGHT | NUMBER OF PAGES TO STORE | HALFTONE PROCESS |
|---|---|---|---|---|
| K | =<5120 | =<7040 | 2 | 1 |
| | | >7040 | 1 | 1 |
| | >5120 | =<5120 | 2 | 1 |
| | | >5120 | 1 | 1 |
| CMYK | =<5120 | =<7040 | 2 | 1 |
| | | >7040 | 1 | 1 |
| | >5120 | =<5120 | 2 | 2 |
| | | >5120 | 1 | 2 |

IMAGE FORMING APPARATUS

This application is based on and claims the benefit of priority from Japanese Patent Application No. 2011-005112, filed on 13 Jan. 2011, the content of which is incorporated herein by reference.

BACKGROUND

The present disclosure relates to an image forming apparatus that performs image processing based on image data.

An image forming apparatus such as a printer, copy machine, multifunction peripheral and the like is equipped with an ASIC (Application Specific Integrated Circuit) prepared according to the size of an original processed by the image forming apparatus.

For example, an image forming apparatus that can feed paper of no larger than an A4-size (A4 apparatus) is equipped with an ASIC prepared to correspond to a paper width of the A4 paper as an image processing width. In addition, an image forming apparatus that can feed paper of no larger than an A3-size (A3 apparatus) is equipped with an ASIC prepared to correspond to a paper width of the A3 paper as an image processing width.

An image forming apparatus can realize cost-effectiveness by employing an ASIC prepared for each supported original size.

In addition, upon output of image data that is read by scanning an original, the image forming apparatus generates a halftone image by a halftone process and adjusts density of the image to be formed by area coverage modulation such as the dither method and the error diffusion method. The halftone process by the dither method or the like, which is performed by a comparatively simple algorithm, is realized by the ASIC.

Here, from a viewpoint of development of various models, an idea of shared use of a module should be promoted not only in a software field but also in a hardware field. Especially, regarding the ASIC, there is a demand for compatibility with an A4 machine and an A3 machine, with a reduced cost. Given this, a software control method and the like that allows use of the ASIC for A4 machine in the A3 machine has been desired.

In a case of using the ASIC for A4 machine in the A3 machine, the following problems may occur.

For example, in a conventional A4 machine, the halftone process is realized by the configuration shown in FIG. 11.

In other words, in conventional image forming apparatus 100, the image data after a rotational process by image rotation unit 110 is stored as band data corresponding to each color of CMYK, in each of 4-channel band buffers 120-1 to 120-4.

Halftone processing unit 130 is capable of processing band data in 4 channels in parallel. Halftone processing unit 130 performs the halftone process by fetching the band data of each color stored in each of 4-channel band buffers 120-1 to 120-4.

And then, the image data after the halftone process is stored as band data corresponding to each color of CMYK, in each of 4-channel band buffers 140-1 to 140-4. The stored band data transmitted to printing engine control unit 150 for printing output.

Using the ASIC for A4 machine in an A3 machine causes the following problem.

In other words, among ASIC modules for the A4 machine, a module for the halftone process only supports a main scan control width of up to 5120 dots (approximately 216.7 mm) due to limited circuit size of the ASIC. Therefore, image data with a width of A3-size original (297 mm) cannot be processed by the ASIC.

As a result, using the ASIC for A4 machine in an A3 machine does not allow processing of an A3-sized original.

SUMMARY

An image forming apparatus according to an embodiment of the present disclosure includes a memory buffer, a data processing unit, a storage unit, and an output processing unit. The memory buffer configured to have a plurality of band buffers for storing band data in which image data is divided into a plurality of bands. The data processing unit configured to perform a specific process with respect to the band data stored in the memory buffer. The storage unit configured to have a storage area that stores image data of a plurality of pages of an original of a specific size, store processed band data that has been subjected to the specific process by the data processing unit into the storage area, and output a plurality of pieces of the processed band data stored in the storage area. The output processing unit configured to perform a print process based on the plurality of pieces of the processed band data that is output from the storage unit.

An method for forming an image by an image forming apparatus according to an embodiment of the present disclosure includes: (a) performing, via a data processing unit, a specific process with respect to band data stored in a memory buffer having a plurality of band buffers for storing band data in which image data is divided into a plurality of bands; and (b) performing, via an output processing unit, a print process based on the plurality of pieces of the processed band data that is output from the storage unit, the storage unit (i) having a storage area that stores image data of a plurality of pages of an original of a specific size, (ii) storing processed band data that has been subjected to the specific process by the data processing unit into the storage area, and (iii) output a plurality of pieces of the processed band data stored in the storage area.

A non-transitory computer-readable recording medium according to an embodiment of the present disclosure stores an image forming program executed by a computer of an image forming apparatus. The image forming program includes a first program code and a second program code. The first program code causes the computer to perform a specific process with respect to band data stored in a memory buffer having a plurality of band buffers for storing band data in which image data is divided into a plurality of bands. The second program code causes the computer to perform a printing process based on the plurality of pieces of the processed band data that is output from the storage unit, the storage unit (i) having a storage area that store image data of a plurality of pages of an original of a specific size, (ii) storing processed band data that has been subjected to the specific process by the data processing unit into the storage area, and (iii) outputting a plurality of pieces of the processed band data stored in the storage area.

Additional features and advantages are described herein, and will be apparent from the following Detailed Description and the figures.

BRIEF DESCRIPTION OF THE DRAWINGS accompanying drawings:

FIG. 10 shows conditions for mode setting; and

DETAILED DESCRIPTION

A embodiment of the image forming apparatus according to the present disclosure is described hereinafter with reference to the drawings.

Processes performed by the image forming apparatus in the present embodiment can be performed by a computer controlled by a program. The program is provided via, for example, a storage medium. As the storage medium, a magnetic disk, an optical disk, semiconductor memory, and any means that the computer can read can be used.

In addition, the program recorded to the storage medium can be read by the computer either directly from the storage medium or via communication lines.

In the present embodiment, the following items are sequentially described.

(1) Configuration of image forming apparatus
(2) Configuration regarding halftone process
(3) Procedure of halftone process
(4) Mode setting (1) Configuration of the Image Forming Apparatus First, the configuration of the image forming apparatus of the present embodiment is described with reference to FIG. 1.

Figure 1:
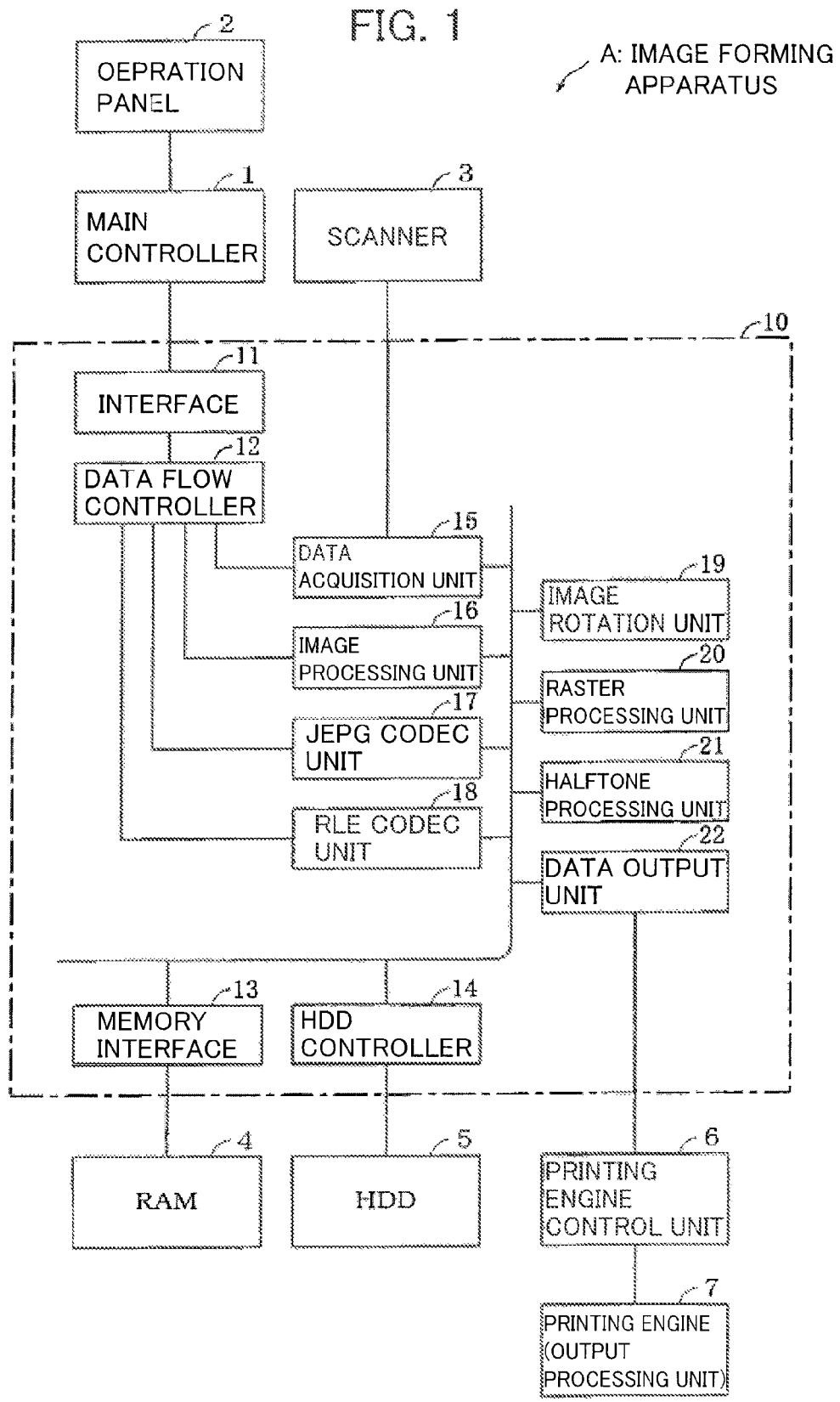
FIG. 1 illustrates a configuration of an image forming apparatus according to an embodiment of the present disclosure.

FIG. 1 is a block diagram illustrating the configuration of the image forming apparatus according to the present embodiment.

The image forming apparatus of the present embodiment includes a printer, a copy machine, a facsimile machine, and a digital multifunction peripheral.

The printer of the present embodiment includes printers of various types, such as an ink-jet printer, a sublimation thermal transfer printer, a dot impact printer, a laser printer, a fusion thermal transfer printer.

As shown in FIG. 1, image forming apparatus A includes: main controller 1; operation panel 2; scanner 3; RAM 4; hard disk drive (HDD) 5; printing engine control unit 6; printing engine (output processing unit) 7; and data processing unit 10.

Main controller 1 controls scanner 3 and the like based on a user's operation on operation panel 2, and provides data processing unit 10 with an instruction.

Main controller 1 is a computer that is provided with a CPU (Central Processing Unit), ROM (Read Only Memory), RAM (Random Access Memory) and the like. Main controller 1 outputs an instruction according to a program stored in the ROM and the like and performs data processing.

Operation panel 2 is composed of, for example, a touch screen and the like. Operation panel 2 displays setting contents and operable items for image forming apparatus A and allows selection of specific items by accepting user's touching operation on a display window on operation panel 2.

Scanner 3 (image reading device) optically reads an image of at least one face of an original and generates image data. Scanner 3 sequentially outputs the image data that is obtained from image reading as band data.

RAM 4 is memory that temporarily stores the band data during processing by data processing unit 10. As RAM 4, at least one DRAM can be used, for example.

A storage area of RAM 4 is used as the band buffers (described later). Each band buffer has a band data area of a size for storing band data. As described later, the band buffers are used for providing band data from image rotation unit 19 to halftone processing unit 21.

HDD 5 is a data storage device that is greater in capacity and lower in speed than RAM 4. HDD 5 is used as a page buffer (described later) for storing page data composed of band data corresponding to one page. In the present embodiment, compressed band data is stored in HDD 5 per page.

Printing engine control unit 6 is a control device that provides printing engine 7 with the image data and controls printing engine 7 to perform printing.

Printing engine 7 is an output processing device that performs printing on paper based on the image data provided from printing engine control unit 6.

Data processing unit 10 is a processor that processes, per band or per page, the image data from scanner 3 and the like. Data processing unit 10 outputs the processed image data to main controller 1, HDD 5, printing engine control unit 6 and the like.

Scanner 3 outputs the image data and property data corresponding to the image data. Data processing unit 10 performs specific processes both on the image data and the property data. The property data is used for setting of a color process and a tone process during image processing. The image data and the property data is processed as page data corresponding to a page, or band data corresponding to one of a plurality of bands obtained by dividing a page. The image data has four planes of C, M, Y and K.

Data processing unit 10 includes: interface 11; data flow controller 12; memory interface 13; HDD controller 14; data acquisition unit 15; image processing unit 16; JPEG codec unit 17; RLE codec unit 18; image rotation unit 19; raster processing unit 20; halftone processing unit 21; and data output unit 22.

Interface 11 transmits and receives data and instructions between main controller 1 and data flow controller 12.

Data flow controller 12 controls and operates DMACs (Direct Memory Access Controllers) of data acquisition unit 15, image processing unit 16, JPEG codec unit 17, and RLE codec unit 18 according to an instruction from main controller 1.

Memory interface 13 transmits and receives data and instructions between RAM 4 and an internal signal wire. The internal signal wire is a signal wire that connects memory interface 13, HDD controller 14, and various units 15 to 22.

HDD controller 14 transmits and receives data with respect to HDD 5.

Data acquisition unit 15 sequentially acquires the image data and the property data from scanner 3 as the band data, and stores the band data to RAM 4.

Image processing unit 16 reads the band data of the image data and the property data from RAM 4, performs image processing (zooming, color conversion and the like) on the band data, and stores the band data thus processed to RAM 4.

JPEG codec unit 17 reads the band data of the image data from RAM 4, compresses the band data by encoding in JPEG (Joint Photographic Experts Group) format, and stores the band data thus compressed to HDD 5. JPEG codec unit 17 also reads the band data from the page data of the image data stored in HDD 5, uncompresses the band data by decoding in JPEG format, and stores the band data thus extracted to RAM 4.

RLE codec unit 18 reads the band data of the property data from RAM 4, compresses the band data by encoding in RLE (Run Length Encoding) format, and stores the band data thus compressed to HDD 5. RLE codec unit 17 also reads the band data from the page data of the property data stored in HDD 5, uncompresses the band data by decoding in RLE format, and stores the band data thus extracted to RAM 4.

Image rotation unit 19 generates image data of an image obtained by rotating the image composed of image data of a page by 90 or 270 degrees.

Raster processing unit 20 reads the band data of the image data (as well as the property data) from RAM 4, performs rasterization on the band data thereby generating raster data. The raster data is compressed by RLE codec unit 18 per band and stored in HDD 5. Thereafter, the raster data thus compressed is read and uncompressed by RLE codec unit 18 per band and stored in RAM 4.

Halftone processing unit 21 reads the raster data per band from RAM 4, performs the halftone process, and stores the data after the halftone process (processed band data) to HDD 5. Halftone processing unit 21 performs a specific process on the image data and therefore corresponds to the data processing unit.

Data output unit 22 reads the data after the halftone process from HDD 5, and provides the data to printing engine control unit 6.

above-described units 11 to 22 are realized as ASICs (Application Specific Integrated Circuits).

(2) Configuration Regarding Halftone Process

Figure 2:
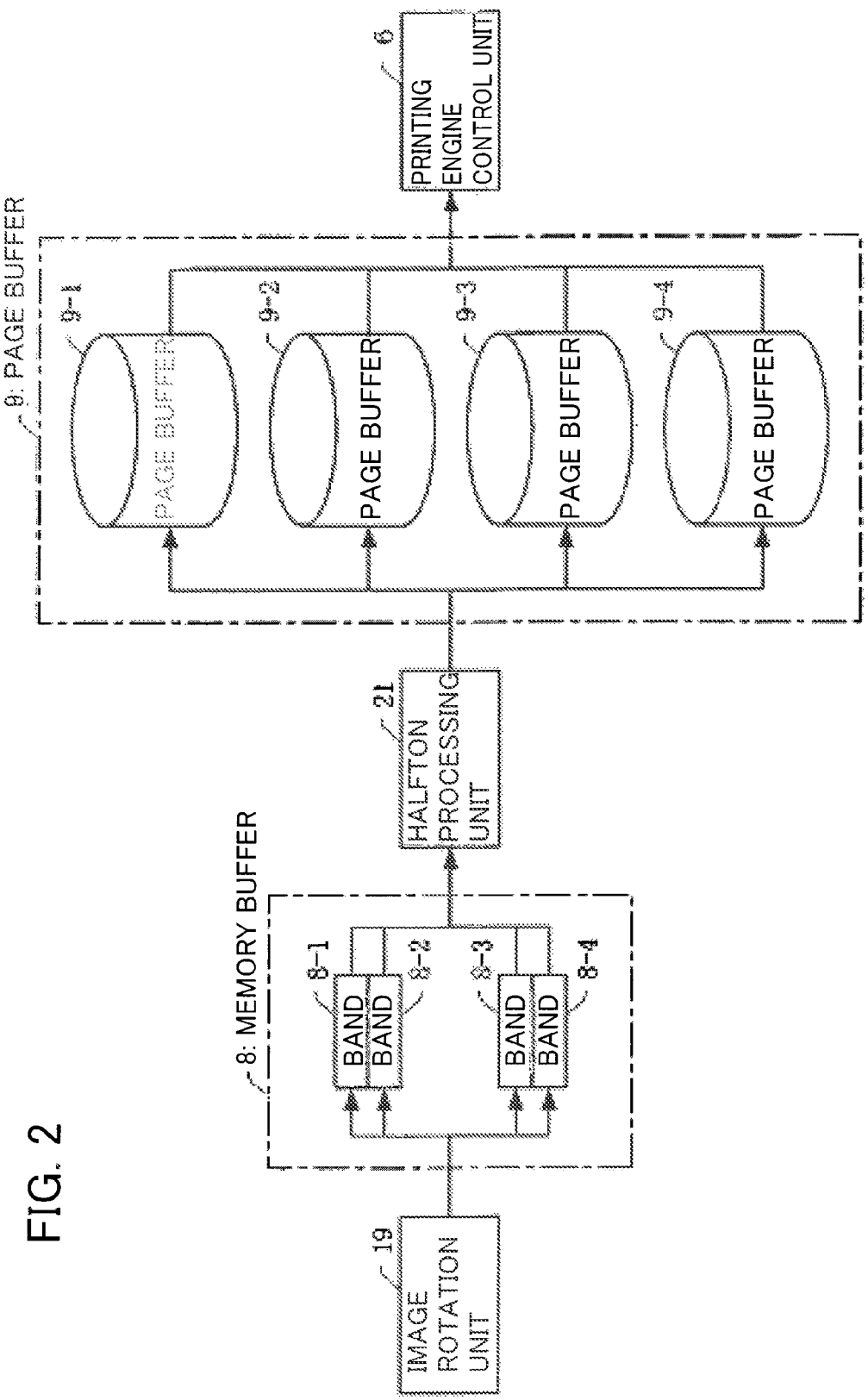
FIG. 2 illustrates a configuration of the image forming apparatus from an image rotation unit to a printing engine control unit.

Next, configuration regarding the halftone process is described with reference to FIG. 2.

In image forming apparatus A, the halftone process is performed on the image data before printing output by the printing engine.

Here, processes to be performed on the image data after the rotation process by image rotation unit 19 and before transmission to printing engine control unit 6, and operation units that perform the processes are described.

The image data after the rotation process by image rotation unit 19 is transferred to memory buffer 8.

Memory buffer 8 stores the image data transferred from image rotation unit 19. Memory buffer 8 includes four band buffers 8-1 to 8-4 that stores the image data per band. A band is a unit of data obtained by dividing image data for a page, by a predetermined number of dots in a scanning direction of a rotational drum, for performing image processing.

More specifically, band buffers 8-1 to 8-4 are allocated to parts of the storage area of the RAM. Band buffers 8-1 to 8-4 each have a storage area that can store a band of the band data among the image data of a page of an original of a specific size (for example, an A4-sized original).

The image data after the halftone process by halftone processing unit 21 is transferred to page buffer 9.

Page buffer 9 stores the image data transferred from halftone processing unit 21. Page buffer 9 includes a plurality of page buffers 9-1 to 9-4 that can store page data corresponding to image data of a page of the original after the halftone process. In the present embodiment, page buffer 9 includes four page buffers 9-1 to 9-4. Storage areas of page buffer 9 that can store 4-page worth image data are allocated to storage areas of the HDD. The storage areas of page buffers 9-1 to 9-4 that can store page data of a page of an A4-sized original each (4-page worth in total) are allocated to storage areas of page buffer 9.

Therefore, in a case in which the original is A4-sized, page buffer 9-1 can store page data in all of colors C, M, Y and K. In a case in which the original is A3-sized, each of page buffers 9-1 to 9-4 each can store page data in each of C, M, Y and K, respectively.

The page data stored in page buffer 9 is transferred to printing engine control unit 6 by data output unit 22, in sync with an internal clock of printing engine control unit 6. By using page buffer 9, an underrun error of printing engine control unit 6 due to delay of page data transfer to printing engine control unit 6 can be prevented.

In addition, by providing page buffer 9, halftone processing unit 21 can operate asynchronously with printing engine control unit 6. Accordingly, the halftone process can be performed for other functions such as transfer of a scanned image, when halftone processing unit 21 is not busy.

The HDD, including page buffer 9, stores the page data for a plurality of pages that is composed of the processed band data after the specific process (the halftone process) by the data processing unit (halftone processing unit 21), and transmits the page data to the output processing unit (printing engine control unit 6 and the printing engine). Therefore, the HDD corresponds to the storage unit.

(3) Procedure of Halftone Process

Next, the procedure of the halftone process is described with reference to FIGS. 3 to 9.

The following items are sequentially described hereinafter.

(3-1) Process for 1-page image data
(3-11) Halftone double process
(3-12) Halftone single process
(3-2) Process for multi-page image data
(3-21) 1-page mode
(3-22) 2-page mode
(3-23) Black/white print mode (3-1) Process for 1-page Image Data
(3-11) Halftone Double Process Halftone double process is a process of performing the halftone process twice with respect to the image data of one page. Halftone double process is to be performed in a case of, for example, processing the image data of A3-width (297 mm) with halftone processing unit 21 supporting only a main scan control width of up to 5120 dots (approximately 216.7 mm).

The procedure of the halftone double process is described with reference to FIGS. 3 to 5.

Figure 3:
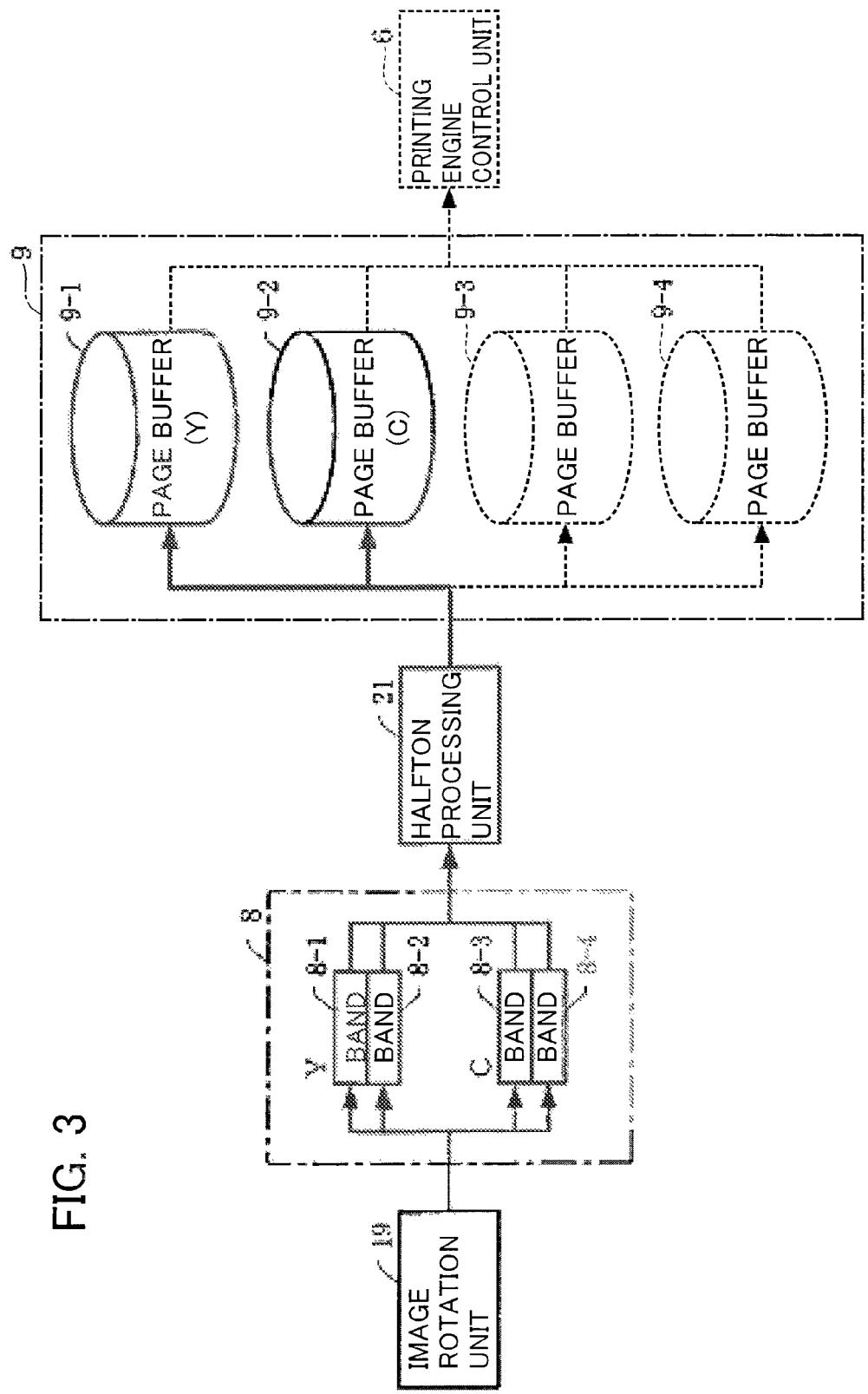
FIG. 3 illustrates a procedure of processing colors Y and C in the configuration illustrated in FIG. 2.

FIG. 3 is a block diagram illustrating a procedure of processing image data of Y and C among the procedure of the halftone double process. FIG. 4 is a block diagram illustrating a procedure of processing image data of M and K among the procedure of the halftone double process. FIG. 5 is a block diagram illustrating a procedure of output after the halftone double process of each color.

As shown in FIG. 3, upon the rotation process on the image data by image rotation unit 19, the band data of a first color (Y in FIG. 3) from the image data is transferred to 2-channel band buffers 8-1 and 8-2 in memory buffer 8, and the band data of a second color (C in FIG. 3) from the image data is transferred to other 2-channel band buffers 8-3 and 8-4.

Halftone processing unit 21 acquires the band data (Y) stored in band buffers 8-1 and 8-2 and the band data (C) stored in band buffers 8-3 and 8-4, and performs the halftone process on the band data. Thereafter, halftone processing unit 21 transfers the band data of Y thus processed to page buffer 9-1 and transfers the band data of C thus processed to page buffer 9-2.

Figure 4:
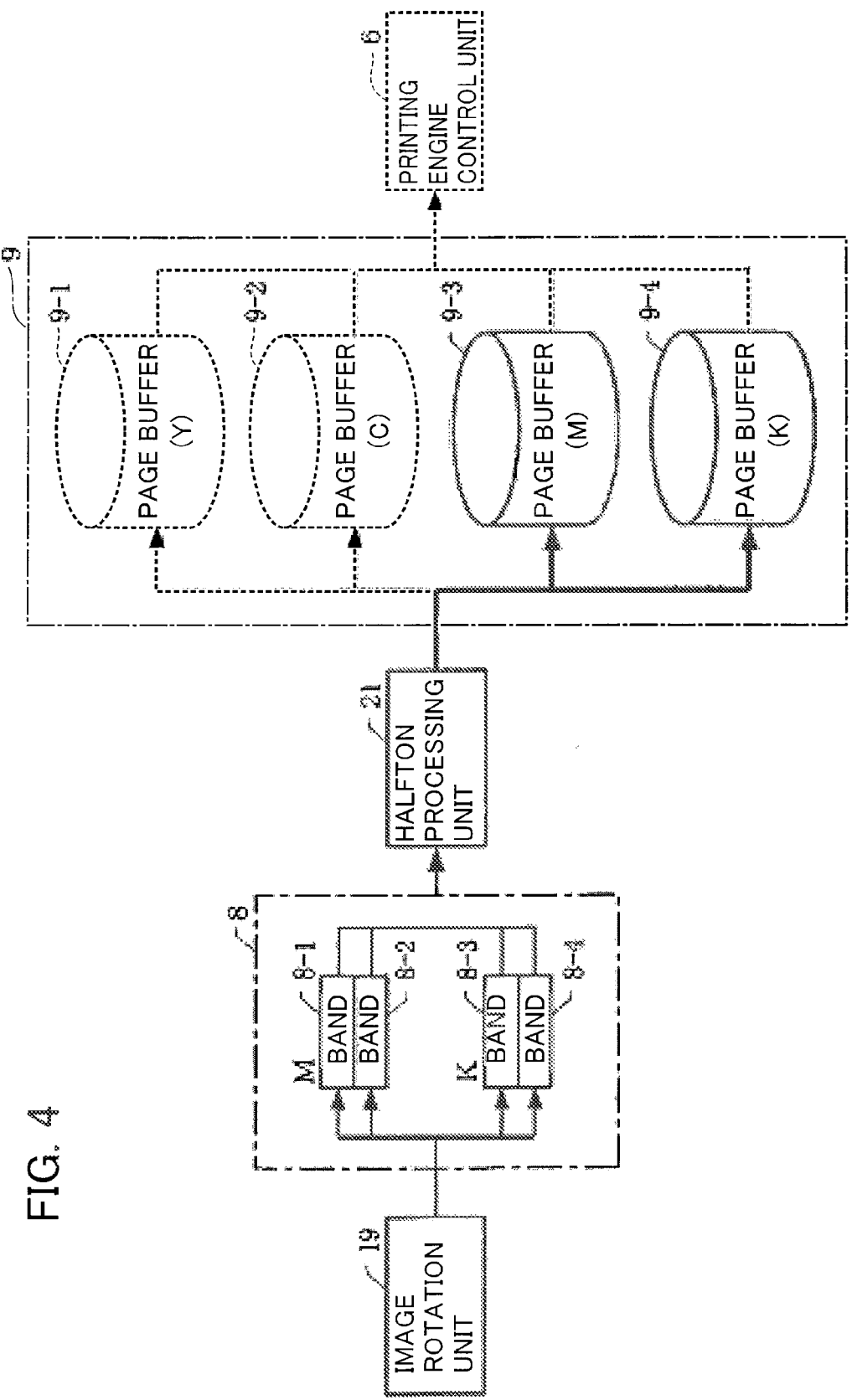
FIG. 4 illustrates a procedure of processing colors M and K in the configuration illustrated in FIG. 2.

Next, as shown in FIG. 4, in memory buffer 8, upon the rotation process by image rotation unit 19, the band data of a third color (M in FIG. 4) from the image data is transferred to 2-channel band buffers 8-1 and 8-2, and the band data of a fourth color (K in FIG. 4) from the image data is transferred to other 2-channel band buffers 8-3 and 8-4.

Halftone processing unit 21 acquires the band data (M) stored in band buffers 8-1 and 8-2 and the band data (K) stored in band buffers 8-3 and 8-4, and performs the halftone process on the band data. Thereafter, halftone processing unit 21 transfers the band data of M thus processed to page buffer 9-3 and transfers the band data of K thus processed to page buffer 9-4.

Figure 5:
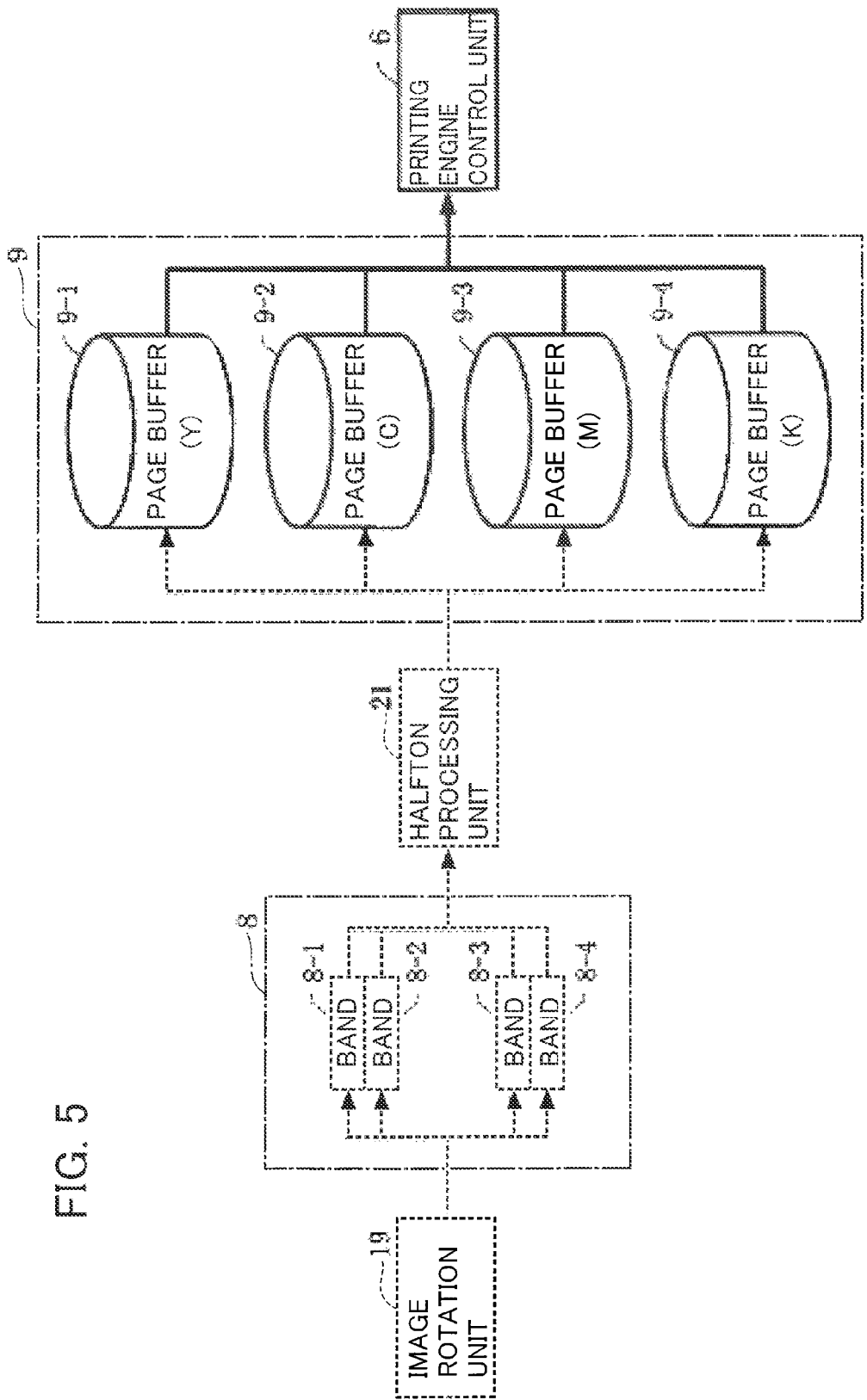
FIG. 5 illustrates a procedure of printing image data stored in page buffers in the configuration illustrated in FIG. 2.

And then, as shown in FIG. 5, when the page data corresponding to the image data of a page of the original is stored in page buffers 9-1 to 9-4, page buffer 9 transmits the page data thus stored to printing engine 7 via printing engine control unit 6. Printing engine 7 outputs by printing the page data thus transmitted.

The image forming apparatus thus can process all the four colors of the image data of A3-width (297 mm) by repeating a step of: concurrently using two of 4-channel band buffers 8-1 to 8-4 for storing the band buffers corresponding to two of the four colors, thereby performing the halftone process on two colors at once.

(3-12) Halftone Single Process

Halftone single process is a process of performing the halftone process at once with respect to the image data of one page. Halftone single process is to be performed in a case of, for example, processing the image data of A4-width with halftone processing unit 21 supporting a main scan control width of up to 5120 dots (approximately 216.7 mm).

The procedure of the halftone single process is described with reference to FIG. 6.

Figure 6:
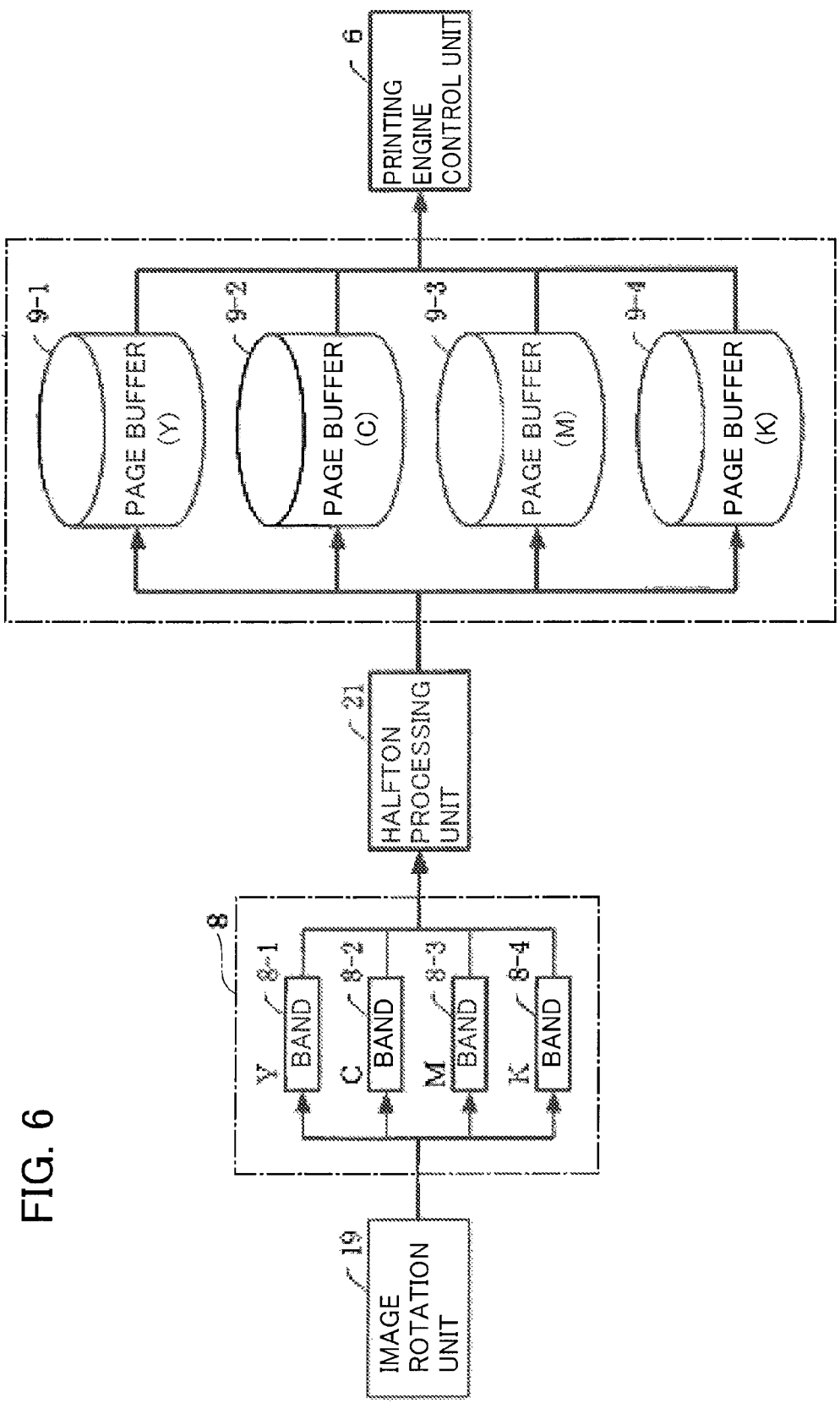
FIG. 6 shows a block diagram illustrating a procedure of processing colors Y, M, C and K in parallel in the configuration illustrated in FIG. 2.

FIG. 6 is a block diagram illustrating a state in which the image data of each color is stored in the band buffer and the page buffer by the halftone single process.

As shown in FIG. 6, upon the rotation process on the image data by image rotation unit 19, the image data is stored as the band data in memory buffer 8. Thereafter, halftone processing unit 21 performs the halftone process on the band data (image data).

Here, in memory buffer 8, after the rotation process, the band data of a first color (Y in FIG. 6) from the image data is transferred to 1-channel band buffer 8-1, and the band data of a second color (C in FIG. 6) from the image data is transferred to another 1-channel band buffers 8-2. In addition, the band data of a third color (M in FIG. 6) from the image data is transferred to 1-channel band buffer 8-3, and the band data of a fourth color (K in FIG. 6) from the image data is transferred to another 1-channel band buffer 8-4.

Halftone processing unit 21 acquires the band data (Y) stored in band buffer 8-1, the band data (C) stored in band buffer 8-2, the band data (M) stored in band buffer 8-3 and the band data (K) stored in band buffer 8-4 and performs the halftone process on each of the band data. Halftone processing unit 21 then transfers the band data of a first color (Y in FIG. 6) thus processed to page buffer 9-1, the band data of a second color (C in FIG. 6) thus processed to page buffer 9-2, the band data of a third color (M in FIG. 6) thus processed to page buffer 9-3, and the band data of a fourth color (K in FIG. 6) thus processed to page buffer 9-4.

And then, when the page data corresponding to the image data of a page of the original is stored in page buffer 9 (the page buffers 9-1 to 9-4), page buffer 9 transmits the page data thus stored to printing engine 7 via printing engine control unit 6. Printing engine 7 outputs by printing the page data thus received.

(3-2) Process for Multi-Page Image Data (3-21) 1-Page Mode

In the 1-page mode, the page data is stored in the page buffer by page during processing of the image data of a plurality of pages.

Procedure in the 1-page mode is described with reference to FIG. 7.

It should be noted that the 1-page mode supposes the halftone double process (FIGS. 3 to 5).

Figure 7:
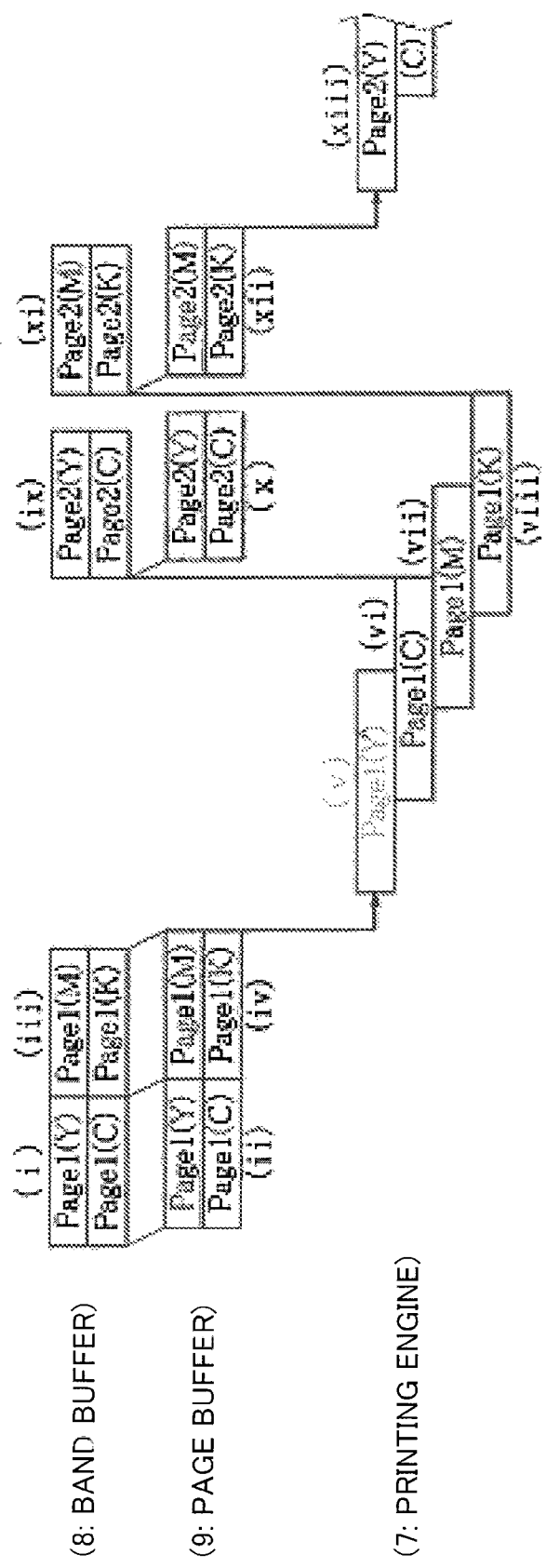
FIG. 7 illustrates processing steps in a single page mode.

First, the band data of Y and C, among the image data of a first page of the original, is stored in band buffers 8-1 to 8-4 as shown in FIG. 7 (i).

The halftone processing unit performs the halftone process on the band data of Y and C stored in band buffers 8-1 and 8-4. And then the band data of Y thus processed is transferred to page buffer 9-1 and the band data of C thus processed is transferred to page buffer 9-2 (FIG. 7 (ii)).

Next, the band data of M and K, among the image data of the first page of the original, is stored in band buffers 8-1 to 8-4 as shown in FIG. 7 (iii).

Halftone processing unit 21 performs the halftone process on the band data of M and K stored in band buffers 8-1 and 8-4. And then the band data of M thus processed is transferred to page buffer 9-3 and the band data of K thus processed is transferred to page buffer 9-4 (FIG. 7 (iv)).

When the page data corresponding to the image data of a page in all the colors Y, C, M and K is stored in page buffers 9-1 to 9-4, the page data is transmitted to printing engine 7 via the printing engine control unit and subjected the to printing process (printing output) (FIG. 7 (v) to (viii)).

When printing engine 7 executes and completes the printing process of color page data corresponding to Y and color page data corresponding to C, band buffers 8-1 to 8-4 then store the band data of Y and the band data of C among the image data of a second page (FIG. 7 (ix)).

The halftone processing unit performs the halftone process on the band data of Y and C stored in band buffers 8-1 to 8-4. And then the band data of Y thus processed is transferred to page buffer 9-1 and the band data of C thus processed is transferred to page buffer 9-2 (FIG. 7 (x)).

When printing engine 7 performs and completes the printing process of color page data corresponding to M and color page data corresponding to K, band buffers 8-1 to 8-4 then store the band data of M and the band data of K among the image data of the second page (FIG. 7 (xi)).

The halftone processing unit performs the halftone process on the band data of M and K stored in band buffers 8-1 to 8-4. And then the band data of M thus processed is transferred to page buffer 9-3 and the band data of K thus processed is transferred to page buffer 9-4 (FIG. 7 (xii)).

Thereafter, the same processes as those for the image data of the first page (FIG. 7 (iv) to (viii)) are performed.

In the 1-page mode, storage of the image data of the second page to memory buffer 8 is started after execution of the printing process of the color page data corresponding to Y and the color page data corresponding to C among the image data of the first page. In the 2-page mode described below, printing speed can be further increased (performance can be improved).

(3-22) 2-Page Mode

In the 2-page mode, the page data is stored in the page buffer by two pages during processing of the image data of a plurality of pages.

The procedure of the halftone single process is described with reference to FIG. 8.

It should be noted that, as in the 1-page mode, the 2-page mode also supposes the halftone double process (FIGS. 3 to 5).

Figure 8:
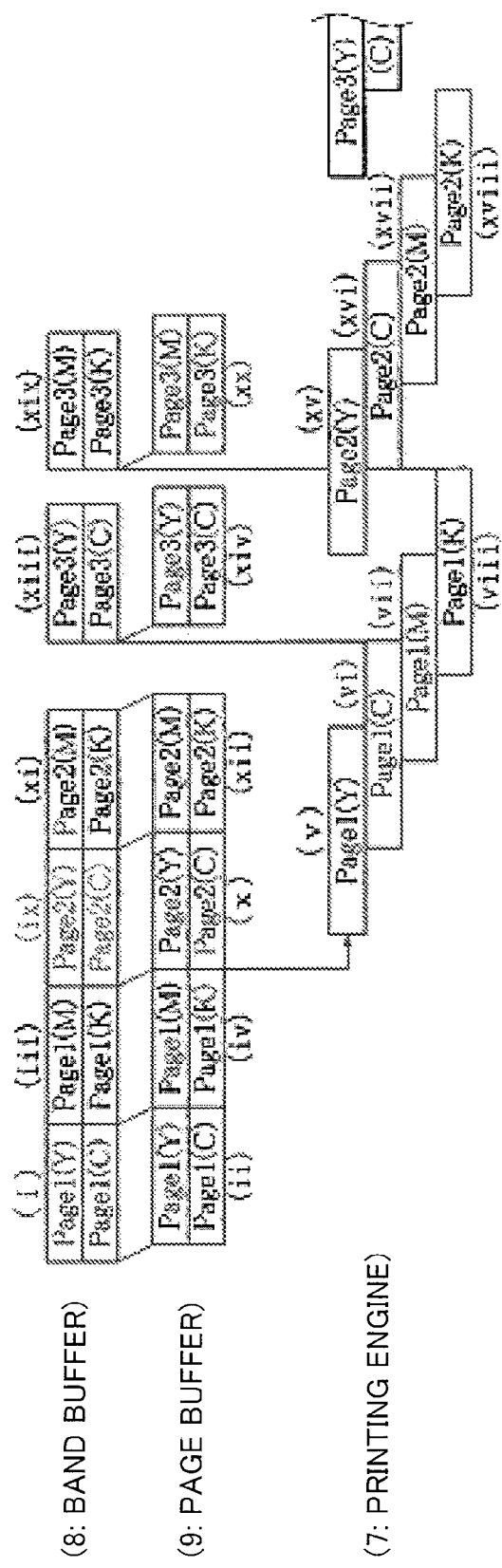
FIG. 8 illustrates processing steps in a two page mode.

The processes (i) to (viii) shown in FIG. 8 are the same as (i) to (viii) shown in FIG. 7.

After that the band data of M and the band data of K, which were stored in band buffers 8-1 to 8-4, among the image data of the first page of the original are transmitted to the halftone processing unit (FIG. 8 (iii) to (iv)), band buffers 8-1 to 8-4 store the band data of Y and the band data of C among the image data of the second page of the original (FIG. 8 (ix)).

Halftone processing unit 21 performs the halftone process on the band data of Y and C stored in band buffers 8-1 to 8-4. And then the band data of Y thus processed is transferred to page buffer 9-1 and the band data of C thus processed is transferred to page buffer 9-2 (FIG. 8 (x)).

Next, the band data of M and K, among the image data of the second page of the original, is stored in band buffers 8-1 to 8-4 as shown in FIG. 8 (xi).

Halftone processing unit 21 performs the halftone process on the band data of M and K stored in band buffers 8-1 to 8-4. And then the band data of M thus processed is transferred to page buffer 9-3 and the band data of K thus processed is transferred to page buffer 9-4 (FIG. 8 (xii)).

When printing engine 7 executes the printing process of color page data corresponding to Y and color page data corresponding to C among the image data of the first page of the original (FIG. 8 (v), (vi)), band buffers 8-1 to 8-4 then store the band data of Y and the band data of C among the image data of a third page (FIG. 8 (xiii)).

Halftone processing unit 21 performs the halftone process on the band data of Y and C stored in band buffers 8-1 to 8-4. And then the band data of Y thus processed is transferred to page buffer 9-1 and the band data of C thus processed is transferred to page buffer 9-2 (FIG. 8 (xiv)).

When printing engine 7 executes the printing process of color page data corresponding to Y and color page data corresponding to C among the image data of the first page of the original (FIG. 8 (v), (vi), (vii)), the printing process of the second page is started (FIG. 8 (xv) to (xviii)).

In addition, after completion of the printing process of the first page, band buffers 8-1 to 8-4 store the band data of M and K among the image data of the third page (FIG. 8 (xix)).

Subsequent processes for the third page are the same as the processes (xi) to (xviii) for the second page.

In the 2-page mode, page buffer 9 can store the page data corresponding to the image data of two pages, storing the page data of second page after finishing storing the page data of the first page. In other words, the page data of the second page is stored to page buffer 9 in parallel with the printing process of the first page by printing engine 7. By storing the page data of the second page to page buffer 9 before completion of the printing process of the first page, printing of the second page can be started before completion of the printing of the first page. As described above, in the 2-page mode, the printing of the second page can start earlier than in the 1-page mode, thereby increasing printing speed in a case in which the original has a plurality of pages (improving performance).

(3-23) Black/White Print Mode

The 1-page mode (3-31) and the 2-page mode (3-32) are selected in a case in which the color original is subjected to full-color printing. On the other hand, black/white printing is generally selected in a case of a black/white original. A procedure similar to that in the 2-page mode can also be performed in the black/white printing.

The procedure of the black/white print mode is described with reference to FIG. 9.

It should be noted that the black/white print mode supposes the halftone single process (FIG. 6).

Figure 9:
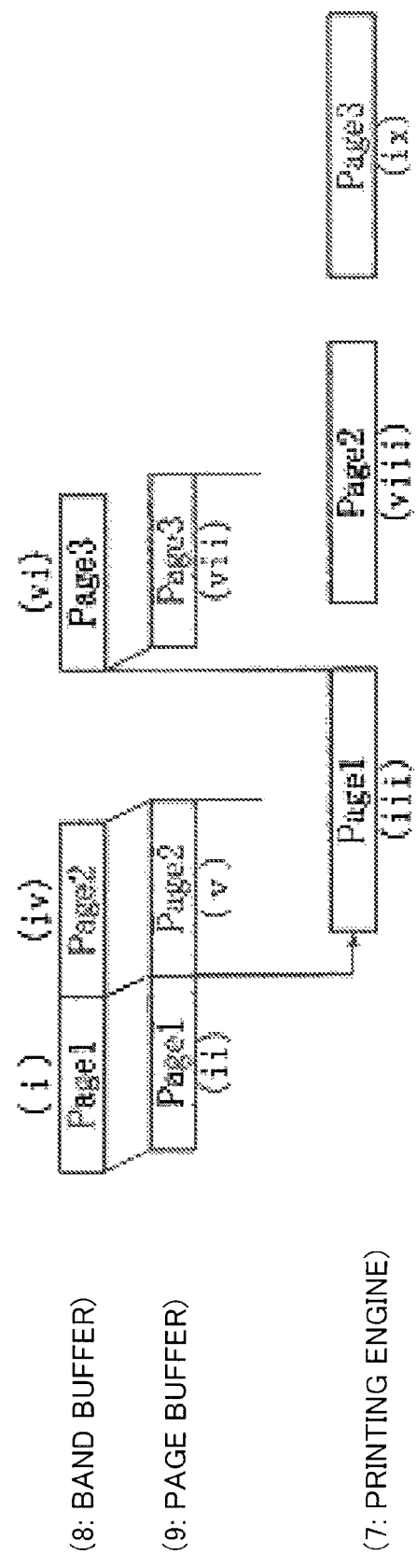
FIG. 9 illustrates processing steps in a black/white printing mode.
Figure 11:
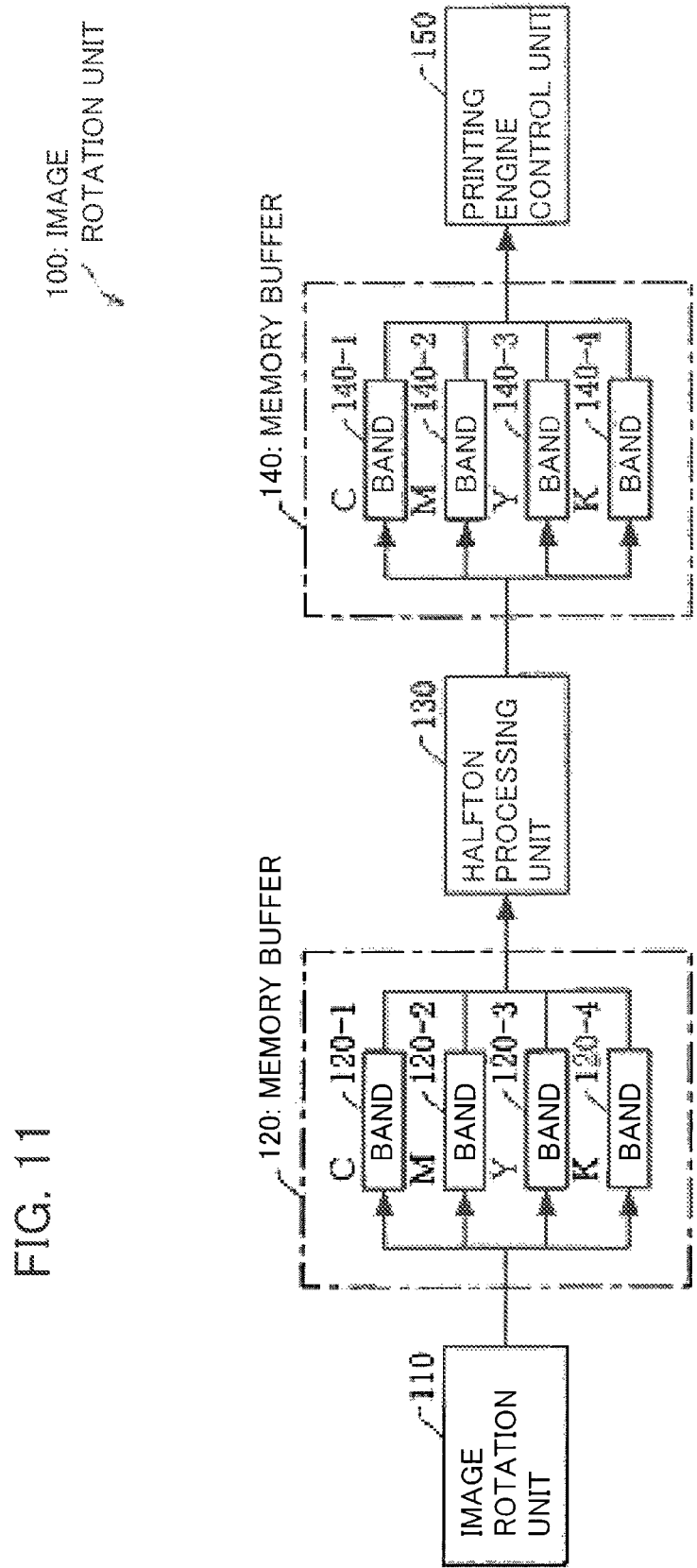
FIG. 11 illustrates a configuration of a conventional image forming apparatus.

First, the image data of a first page of the original (image data of K) is stored as band data to band buffers 8-1 to 8-4 (FIG. 9 (i)).

Next, the band data stored in band buffers 8-1 to 8-4 is subjected to the halftone process by halftone processing unit 21 and then transferred to page buffer 9 (FIG. 9 (ii)).

The image data is transmitted to printing engine 7 where the printing output is performed (FIG. 9 (iii)).

After that the image data of the first page of the original is transmitted to halftone processing unit 21, band buffers 8-1 to 8-4 store the image data of a second page of the original as band data (FIG. 9 (iv)).

The band data stored in band buffers 8-1 to 8-4 is subjected to the halftone process by halftone processing unit 21, and then transferred to page buffer 9 (FIG. 9 (v)).

After completion of the printing process of the first page by printing engine 7 (FIG. 9 (iii)), band buffers 8-1 to 8-4 store the image data of a third page as the band data (FIG. 9 (vi)).

The band data stored in band buffers 8-1 to 8-4 is subjected to the halftone process by halftone processing unit 21, and then transferred to page buffer 9 (FIG. 9 (vii)).

When the printing process of the first page is completed by printing engine 7 (FIG. 9 (iii)), the printing process of the second page is started (FIG. 9 (viii)). Thereafter, when the printing process of the second page is completed (FIG. 9 (viii)), the printing process of a third page is started (FIG. 9 (ix)).

In the black/white print mode, page buffer 9 can store the page data corresponding to the image data of two pages. Image forming apparatus A stores the page data of second page after finishing storing the page data of the first page. In other words, in image forming apparatus A, the page data of the second page is stored in parallel with the printing process of the first page by printing engine 7. As page buffer 9 can complete storage of the page data of the second page before completion of the printing process of the first page. Image forming apparatus A can start the printing process of the second page immediately after completion of printing of the first page. As a result, also in the black/white print mode, image forming apparatus A can increase printing speed in a case in which the original has a plurality of pages (improving performance).

(4) Mode Setting

In "(3) Procedure of halftone process" section, the halftone single process in which the halftone process is performed once with respect to the image data of one page and the halftone double process in which the halftone process is performed twice with respect to the image data of one page are described. The halftone single process and the halftone double process can be selected and configured according to color and size of the original. Image forming apparatus A can be configured either to allow a user to select a mode or to provide a mode selection unit that automatically selects an appropriate mode based on the image data and the property data.

For example, as shown in FIG. 10, "color", "width" and "height" can be provided as conditions for selection of a mode. "Color" is a color of an image on the original.

"Color" includes "K" indicating black/white and "CMYK" indicating multi-color.

"Width" and "height" represent the size of the original. In the present embodiment, the mode selection unit can be configured to select a mode with thresholds 5120 and 7040, which are numbers of pixels in a main scanning direction and a vertical scanning direction (sub scanning direction), respectively.

Modes to be selected also include "Number of pages to store" and "Halftone process".

"Number of pages to store" is a mode allowing selection of number of pages (1 page or 2 pages) to store in the page buffer as the page data, supposing the storage area of the page buffer corresponds to an A3-sized page. "Number of pages to store" can be selected also in a case of the halftone single process, unlike the 2-page mode and the 1-page mode described above.

"Halftone process" is a mode allowing selection of the halftone single process and the halftone double process (multiple processing).

For example, in a case in which an image on the original is black/white (K), the width is no greater than 5120 dots, and the height is no greater than 7040 dots, the mode selection unit selects 2-page mode in "Number of pages to store" and the halftone single process in "Halftone process".

On the other hand, in a case in which an image on the original is multi-color (CMYK), the width is greater than 5120 dots, and the height is greater than 7040 dots, the mode selection unit selects 1-page mode in "Number of pages to store" and the halftone double process in "Halftone process".

Such a selection of mode can be automatically performed by the data processing unit and the main controller, for example. In this case, the data processing unit and the main controller correspond to the mode selection unit.

By allowing selection of the number of pages to store and types of the halftone process according to the color and size of the original, image forming apparatus A can print the original larger than Letter size with the ASIC for A4 machine.

As described above, in the image forming apparatus according to the present embodiment: a page buffer that can store the processed band data of a plurality of pages after the halftone process by the halftone processing unit is provided; a memory buffer stores the image data of each color read from an original as band data in a specific order; and the halftone processing unit performs the halftone process with respect to the band data of each color stored in the memory buffer in a specific order for each at least one color, thereby allowing storage of all the processed band data after the halftone process in the page buffer. The ASIC for A4 machine that supports only up to A4 width (or Letter width) as a processing width can thus be used for an A3 machine.

In addition, as the page buffer can store the page data corresponding to the image data of at least one page of the original, the halftone process can be performed sequentially on the image data without waiting for completion of the printing process of a page by the printing engine. This can reduce the time between completion of printing of a page and start of printing of a subsequent page, thereby maximizing printing performance of the A3 machine.

In addition, by configuring the page buffer to have a storage area worth of an A3 page, a cost for the HDD can be reduced. By increasing the memory size of the page buffer, the printing performance for larger sizes can also be improved. Accordingly, performance for all the sizes can be improved by adding optional memory and increasing the size of allocated memory.

A embodiment of the present disclosure has been described above; however, the image forming apparatus of the present disclosure is not limited thereto and can be carried out in various modes within a scope of the present disclosure.

For example, by adding optional memory to the above-described image forming apparatus, the function and performance thereof can be extended. In addition, use of the ASIC for A4 machine in an A3 machine has been described in the abovementioned embodiment; however, the present disclosure is not limited thereto and the present disclosure can also be applied to use of the ASIC for A4 machine in an A2 machine and an A1 machine.

Furthermore, two band buffers store band data of one color in the halftone double process shown in FIGS. 3 to 5; however, the present disclosure is not limited thereto and can be configured such that three or four band buffers store band data of one color. In this case, the band buffers sequentially store the image data of each color in a page of the original, the halftone processing unit performs the halftone process sequentially on the band data stored in the band buffers, and the page buffers sequentially store the band data thus processed.

It should be understood that various changes and modifications to the presently embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An image forming apparatus comprising:
   a memory buffer configured to have a plurality of band buffers for storing band data in which image data is divided into a plurality of bands;
   a data processing unit configured to perform a specific process with respect to the band data stored in the memory buffer;
   a storage unit configured to have a storage area that stores image data of a plurality of pages of an original of a specific size, store processed band data that has been subjected to the specific process by the data processing unit into the storage area, and output a plurality of pieces of the processed band data stored in the storage area;
   an output processing unit configured to perform a print process based on the plurality of pieces of the processed band data that is output from the storage unit; and
   a mode selection unit, wherein
   the image data is divided by colors in the band data,
   the memory buffer performs a storing process in a specific order for each at least one color, for storing the band data corresponding to a color in at least two band buffers,
   the data processing unit performs the specific process with respect to the band data stored in the band buffers, in a specific order for each at least one color,
   the data processing unit includes a multiple execution mode in which the data processing unit performs the specific processing in multiple times with respect to a page of the original and a single mode in which the data processing unit performs the specific processing once with respect to a page of the original, and
   the mode selection unit is configured to allow selection of any one of the multiple execution mode and the single mode according to at least any one of the color and size of the original.

2. The image forming apparatus according to claim 1, wherein the storage unit performs a storage process for storing the processed band data that has been subjected to the specific process by the data processing unit in a specific order for each at least one color and, after storing the band data for all colors in a page of the original, outputs the processed band data in a specific order for each at least one color, and the output processing unit performs a print process based on the processed band data for the page of the original that is output from the storage unit.

3. The image forming apparatus according to claim 2, wherein, after the storing process by the memory buffer, the specific process by the data processing unit, and the storage process by the storage unit are completed for all colors in a page of the original, the storing process by the memory buffer, the specific process by the data processing unit, and the storage process by the storage processing unit are subsequently performed for a subsequent page of the original.

4. The image forming apparatus according to claim 2, wherein:

after the storing process by the memory buffer, the specific process by the data processing unit, and the storage process by the storage unit are completed for all colors in a page of the original, the storage unit subsequently outputs the corresponding processed band data in a specific order for each at least one color, the output processing unit performs the print process, in a specific order for each at least one color, based on the processed band data thus received, and the memory buffer performs the storing process with respect to, among the band data corresponding to each color in the subsequent page of the original, the band data corresponding to a color that is the same as that of the band data for which the print process is completed by the output processing unit.

5. The image forming apparatus according to claim 1, wherein the storage unit comprises a plurality of page buffers that store page data corresponding to image data of a page of an original.

6. The image forming apparatus according to claim 5, wherein the storage unit comprises as many page buffers as the band buffers.

7. The image forming apparatus according to claim 5, wherein the storage unit stores color page data corresponding to each of a plurality of colors in each of the plurality of page buffers.

8. The image forming apparatus according to claim 1, wherein the band buffer of the memory buffer has a storage area for each color that store image data of a color in a page of an A4-sized original as band data.

9. The image forming apparatus according to claim 1, wherein the data processing unit is a halftone processing unit that generates a halftone image by performing a halftone process.

10. The image forming apparatus according to claim 1 further comprising an image reading device configured to read an image of each page of an original and generate image data, wherein the memory buffer stores image data generated by the image reading device, or band data in which image data that has been subjected to a specific process after generation is divided into a plurality of bands.

11. A method for forming an image by an image forming apparatus, comprising:

storing, via a memory buffer having a plurality of band buffers, band data in which image data is divided into a plurality of bands each corresponding to a color, the memory buffer performing a storing process in a specific order for each at least one color, for storing the band data corresponding to a color in at least two band buffers;

performing, via a data processing unit, a specific process with respect to the band data stored in the memory buffer, the data processing unit performing the specific process with respect to the band data stored in the band buffers, in a specific order for each at least one color and including a multiple execution mode in which the data processing unit performs the specific processing in multiple times with respect to a page of the original and a single mode in which the data processing unit performs the specific processing once with respect to a page of the original;

allowing, via a mode selection unit, to select any one of the multiple execution mode and the single mode according to at least any one of the color and size of the original; and performing, via an output processing unit, a print process based on the plurality of pieces of the processed band data that is output from a storage unit, the storage unit (i) having a storage area that stores image data of a plurality of pages of an original of a specific size, (ii) storing processed band data that has been subjected to the specific process by the data processing unit into the storage area, and (iii) outputting a plurality of pieces of the processed band data stored in the storage area.

12. A non-transitory computer-readable recording medium that stores an image forming program executed by a computer of an image forming apparatus, the recording medium includes instructions for causing the computer to implement a method comprising:

storing, via a memory buffer having a plurality of band buffers, band data in which image data is divided into a plurality of bands each corresponding to a color, the memory buffer performing a storing process in a specific order for each at least one color, for storing the band data corresponding to a color in at least two band buffers;

performing, via a data processing unit, a specific process with respect to the band data stored in the memory buffer, the data processing unit performing the specific process with respect to the band data stored in the band buffers, in a specific order for each at least one color and including a multiple execution mode in which the data processing unit performs the specific processing in multiple times with respect to a page of the original and a single mode in which the data processing unit performs the specific processing once with respect to a page of the original;

allowing, via a mode selection unit, to select any one of the multiple execution mode and the single mode according to at least any one of the color and size of the original; and performing, via an output processing unit, a printing process based on the plurality of pieces of the processed band data that is output from a storage unit, the storage unit (i) having a storage area that store image data of a plurality of pages of an original of a specific size, (ii) storing processed band data that has been subjected to the specific process by the data processing unit into the storage area, and (iii) outputting a plurality of pieces of the processed band data stored in the storage area.

* * * * *